SiO₂ - Al₂O₃ - BeO System
Represented by Mole Per Cent

INVENTOR.
ROBERT M. McMARLIN 3,597,246
GLASS COMPOSITION
Robert M. McMarlin, Newark, Ohio, assignor to
Owens-Corning Fiberglas Corporation
Filed Mar. 31, 1967, Ser. No. 627,460
Int. Cl. C03c 3/04, 13/00
U.S. Cl. 106—50                                    18 Claims

ABSTRACT OF THE DISCLOSURE

A glass composition is formed from only three constituents—silica, alumina, and beryllia. The fibers formed from said composition, on conventional production equipment, exhibit improved modulus, tensile strength and density over formerly available textile filaments, and show particular utility in reinforcement of plastic laminates where high strength to weight ratios are desired and imperative, for example, in nose cones, rocket motor cases and submarines.

---

This invention relates to glass compositions and particularly to glass compositions for forming glass fibers exhibiting three specific properties—high tensile strength, high modulus of elasticity, and a low density.

This combination of physical properties becomes important and is useful in reinforcement of plastic laminates when light weight, high strength construction is imperative. Glass fibers produced from the glass compositions of this invention meet this criteria and find use in the aircraft industry and particularly in reinforced materials used in the construction of missiles, rockets, rocket motor covers, satellites, and other space and deep submergence vehicles (submarines) and watercraft.

Commercial filament E-glass is typical of fibers possessing high tensile strength that are used as reinforcement for plastic and resin laminated structures. E-glass has a virgin glass fiber tensile strength of 500,000 p.s.i. and a virgin fiber density of 2.54 g./cc. The use of the term "virgin" herein denotes that no sizing or after treatment has been applied to said fiber.

It is one object of this invention to provide a glass composition, that is fiberizable, having greatly improved tensile strength and modulus and exhibiting a lower density.

It is another object of this invention to provide a glass composition made only of three components, $SiO_2$, $Al_2O_3$, and BeO, that is fiberizable and which fibers therefrom possess exceptionally good properties.

It is a further object to provide a glass composition that is fiberizable and possesses a highly reactive surface that readily couples with protective compositions such as sizes, lubricants, finishes, various after treatments and the like.

The components of the glass composition are present in the following proportions, expressed in mole percent. The preferred ranges of proportions for each constituent are as follows:

| Oxide: | Mole percent |
|---|---|
| $SiO_2$ | 63.0–77.0 |
| $Al_2O_3$ | 10.0–20.0 |
| BeO | 9.0–25.0 |

This range of proportions for each constituent was selected only after a detailed study had been undertaken and evaluated.

In the development of this invention it was found that the effect of the thermal treatment on tensile strength and modulus was very critical. The results for the glass having the following composition, expressed in mole percent, are as shown: $SiO_2$—70.0%, $Al_2O_3$—12.5%, BeO—17.5%.

TABLE I.—THE EFFECT OF THERMAL TREATMENT ON TENSILE STRENGTH AND MODULUS

| Batch melting | | Forming temp., °F. | Tensile, p.s.i.×10³ | Modulus, p.s.i.×10⁶ |
|---|---|---|---|---|
| Time | Temp., °F. | | | |
| 4 hours | 2,900 | 2,915 | 471 | |
| Do | 2,900 | 2,965 | 625 | 12.7 |
| Do | 3,200 | 2,850 | 440 | 12.5 |
| Do | 3,200 | 2,915 | 500 | 11.8 |
| Do¹ | 3,200 | 2,915 | 500 | 14.3 |
| Do | 3,200 | 2,975 | 540 | |
| 8 hours | 2,900 | 2,890 | 453 | |
| Do | 2,900 | 2,915 | 532 | 13.4 |
| Do | 3,200 | 2,915 | 535 | |
| Do | 3,200 | 2,965 | 525 | 14.5 |
| 24 hours | 2,900 | 2,900 | 700 | 12.4 |
| Do | 2,900 | 2,915 | 681 | 14.1 |
| Do¹ | 2,900 | 2,915 | 670 | 14.4 |
| Do | 2,900 | 2,950 | 696 | |

¹ Properties rechecked using a new batch of glass.

The "batch melting time and temp.," as the heading of the first column, is a phrase used to denote the time and temperature necessary to get homogeneity in small batch glass melts.

The table shows that for small glass batch melts the physical properties improve when the glass composition is melted at optimum conditions, wherein the batch-melting time is 24 hours at a temperature of 2900° F. When the glass composition is melted below optimum conditions, its tensile strength shows no great advantage over conventional fibers of E-glass.

These results show that when the glasses of this invention are commercially fiberized, careful temperature control of the production melting unit must be maintained. Higher melting temperatures in production units reduces the long period of time required at the lower temperatures. For example, at temperatures of about 3200° F. the melting time is approximately 4 hours to insure homogeneity of the mixture. The melting time is also substantially reduced by the fact that larger quantities of ingredients are used which insures a more complete mixing before the fibers are formed therefrom.

Figure 1:
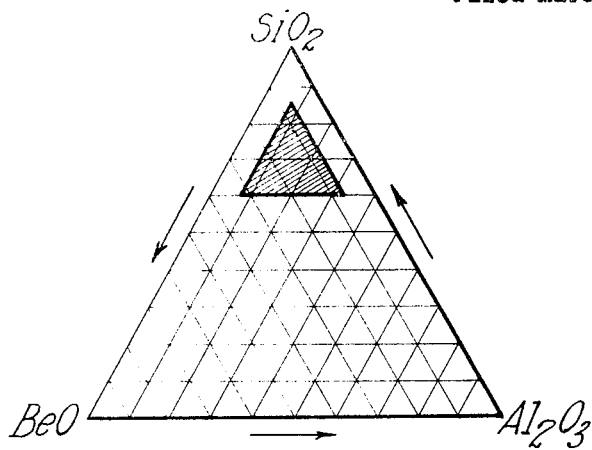
FIG. 1 represents a phase diagram of the three component glass compositions bounded therein which are within the scope of this invention.
Figure 2:
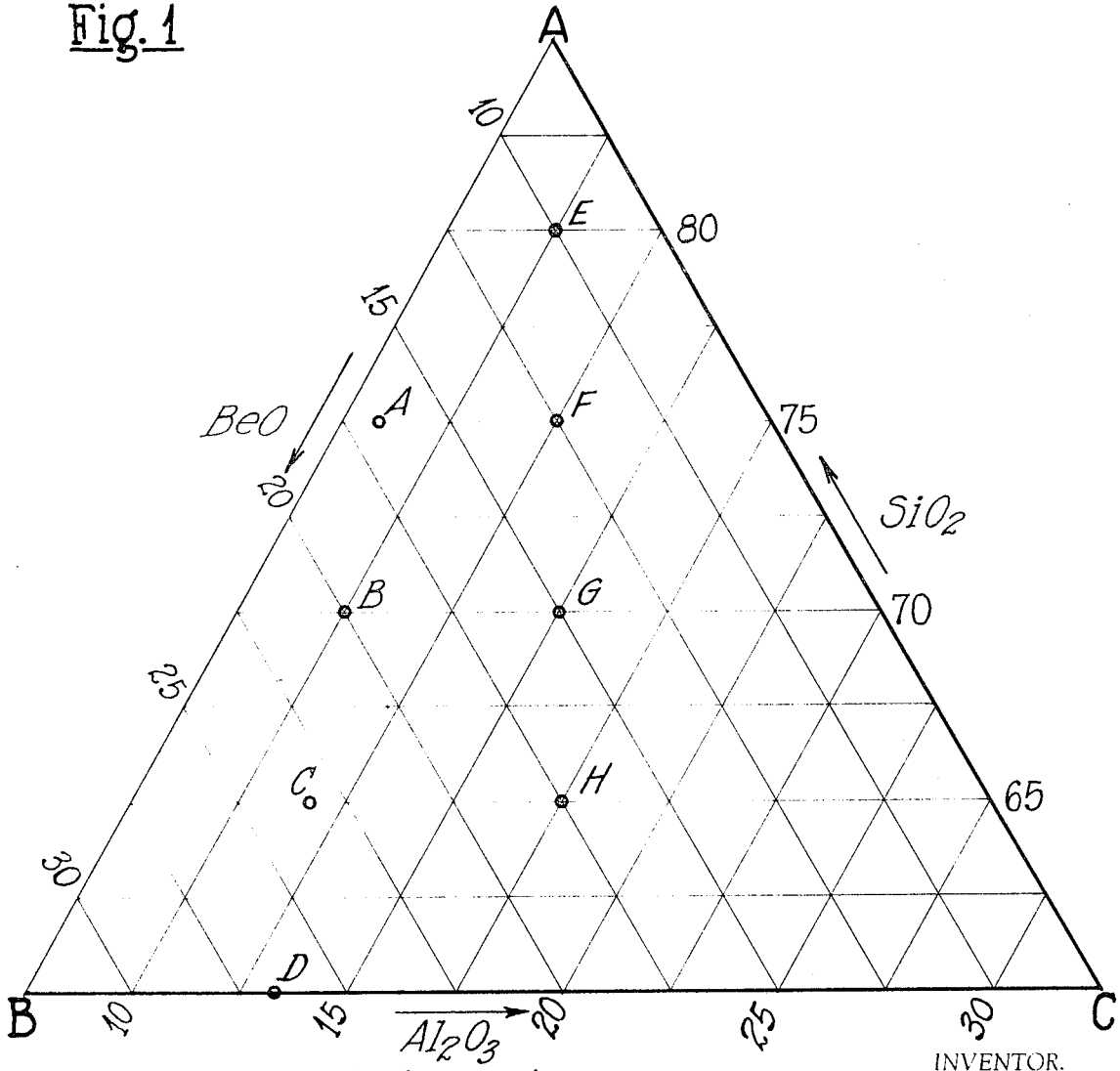
FIG. 2 is an enlargement of the area bounded in FIG. 1, which represents the ranges of glass compositions encompassed in this invention.

The $SiO_2$-$Al_2O_3$-BeO System of FIGS. 1 and 2 are represented in mole percents.

Extensive studies of the region in the phase diagram of FIG. 2 bounded by an imaginary line drawn through points labeled A, B, C, D and an imaginary line drawn through points E, F, G, H were conducted. This region is characterized by $Al_2O_3$/BeO mole ratios that range from 0.50 to 1.00 and $SiO_2$ mole percentages that range from 60.0–80.0. Glasses of these compositions, when melted under optimum conditions herein above described, produce the desired physical properties of high tensile strength, high modulus and low density. Other compositions within the area of the large phase diagram of FIG. 2 also produced glass fibers having high tensile strength and high modulus. Ranges of compositions within this area are as follows:

| Oxide: | Mole percent |
|---|---|
| $SiO_2$ | 60–80 |
| $Al_2O_3$ | 8–25 |
| BeO | 8–30 |

The use of beryllia in glasses of the type described yields improved properties of the fibers produced therefrom. Said fibers exhibit high modulus of elasticity and low density.

Glasses of high Young's modulus are obtained when the interstices of a silicate network are filled with ions of high field strength. Beryllium is characterized as such an ion. Previous investigation has shown that such glasses are characterized by a low content of network formers, including silica and alumina. Compared on a cation-for-cation basis, beryllium is one of the most effective ions in raising the Young's modulus.

Below is a comparison of the ionic size and field strength of beryllium, magnesium and calcium:

| Ion | Ionic size | Field strength |
|---|---|---|
| Be | 0.31 | 16.7 |
| Mg | 0.65 | 4.5 |
| Ca | 0.99 | 2.0 |

Because beryllium is so small in ionic size and possesses such a high field strength, glass compositions containing this element have enhanced devitrification and phase separation tendencies, but heretofore such tendencies have made fiberization of good quality fibers most difficult. Irrespective of these tendencies, good quality fibers were formed from compositions within the phase diagram of FIG. 2 by melting said compositions under carefully controlled conditions to obtain homogeneity before fiber-forming.

Commercially, one method or apparatus by which the glasses of this invention may be melted under carefully controlled conditions to obtain a homogenized melt, is described in U.S. patent, Veazie, et al. 3,264,076. Good quality fibers possessing very high tensile strength, high modulus, and low density were obtained from said homogenized melt.

Glass compositions have been prepared and samples tested as indicated in the following examples, wherein the ingredients are proportioned by mole percent. Said examples are shown as specific embodiments of this invention and are by no means limitations thereon.

EXAMPLES I–VII

Each glass composition was prepared by dry mixing the appropriate oxides, which were of at least U.S.P. grade, in a double-cone agitator wheel blender for approximately ten minutes. The dry batch was melted in precious metal crucibles. The melting temperatures utilized ranged from 2900–3200° F.; each glass was held at a temperature for periods ranging from 4–24 hours. Cullet was formed by plunging the hot crucible into a water bath at room temperature. Fibers were obtained from the glass compositions by remelting the prepared cullet in a one-hole precious metal bushing capable of reaching temperature in excess of 3200° F.

TABLE II

|  | Control E-glass | I | II | III | IV | V | VI | VII |
|---|---|---|---|---|---|---|---|---|
| $SiO_2$ | 70.0 | 70.0 | 70.0 | 68.6 | 67.7 | 70.0 | 65.0 | 76.6 |
| $Al_2O_3$ | 12.5 | 17.0 | 11.7 | 14.4 | 15.0 | 14.6 | 13.4 |
| BeO | 17.5 | 13.0 | 19.7 | 17.9 | 15.0 | 20.4 | 10.7 |
| Virgin fiber density, g./cc | 2.54 | 2.38 | 2.42 | 2.37 | 2.27 | 2.40 | 2.37 | 2.30 |
| Tensile, p.s.i.×10³ | 500 | 681 | 778 | 702 | 650 | 742 | 537 | 754 |
| $Al_2O_3$/BeO mole ratio | | 0.71 | 1.31 | 0.59 | 0.81 | 1.0 | 0.72 | 1.34 |
| Modulus, p.s.i.×10⁶ | 10.5 | 14.0 | 14.0 | 13.8 | 13.5 | 12.0 | 14.2 | 12.8 |

Examination of the data in Table II shows that Examples I–VII are glass compositions within the range of this invention. The low density glass has tensile strengths ranging from 127% to 156% that of commercial E-glass, and moduli ranging from 114% to 135% that of commercial E-glass, and fiber density ranging from 5%–11% lower than that of commercial E-glass.

In glasses of the silica-alumina-beryllia type the most important single factor in raising the Young's modulus, while maintaining low density, is the addition of beryllia. It has been determined by previous investigation that only in beryllia glass compositions does the density decrease, whereas other cations, including magnesium and calcium, increases the density of glass compositions. This factor of low density is not an inherent characteristic since the density of beryllium (1.85 g./cc.) is higher than that of magnesium (1.740 g./cc.) and calcium (1.415 g./cc.), but is dependent upon the role which the beryllium ion plays in the structure.

Because of its lower density the glasses of this invention inherently have a specific tensile strength and specific modulus of elasticity greater than that of E-glass. One method for relating or defining the specific tensile strength and specific modulus of elasticity is by the following formulae:

(1) Specific $T.S. = T.S./\rho$
(2) Specific modulus $= Y/\rho$ wherein $T.S.$ = tensile strength measured in p.s.i.
$Y$ = modulus of elasticity, p.s.i.
$\rho$ = density, measured in #/in.³

Following is a table showing the specific tensile strength and specific modulus for E-glass, S-glass and the glasses of this invention. S-glass, a magnesia-alumina-silica compoition, was included in this table to emphasize the improved properties of this invention, for S-glass is especially known for its high strength to weight ratio. Also included in the table is a column showing the product of specific tensile strength and specific modulus.

TABLE III

| Glass | Tensile, p.s.i., 10³ | Modulus, p.s.i., 10⁶ | Density, lbs./in.³ | | $TS/\rho$, 10⁻⁴ | $Y/\rho$, 10⁻³ | $TS/\rho \times Y/\rho$, 10⁻¹⁴ |
|---|---|---|---|---|---|---|---|
| E-glass | 500 | 10.5 | 2.54 g./cc | 0.092 | 5.43 | 1.14 | 6.19 |
| S-glass | 700 | 12.4 | 2.49 g./cc | 0.090 | 7.78 | 1.38 | 10.74 |
| Example: | | | | | | | |
| I | 681 | 13.1 | 2.38 g./cc | 0.086 | 7.93 | 1.52 | 12.02 |
| II | 778 | 14.0 | 2.42 g./cc | 0.088 | 8.85 | 1.59 | 14.09 |
| III | 702 | 13.8 | 2.37 g./cc | 0.086 | 8.17 | 1.61 | 13.15 |
| IV | 650 | 13.5 | 2.27 g./cc | 0.082 | 7.93 | 1.63 | 13.10 |
| V | 742 | 12.0 | 2.40 g./cc | 0.087 | 8.44 | 1.38 | 11.65 |
| VI | 537 | 14.2 | 2.37 g./cc | 0.086 | 6.25 | 1.65 | 10.31 |
| VII | 734 | 12.8 | 2.37 g./cc | 0.086 | 8.65 | 1.49 | 12.90 |

In the above table, the ratio of $TS/\rho$ is used to denote the high strength to weight relationship. $Y/\rho$ is used to denote the high bending or flex to weight relationship. The product of $TS/\rho \times Y/\rho$ is used by the Air Force Testing Laboratories as another criteria for rating different glass compositions that find use in rocket motor chambers.

A look at Table III shows that the glasses of this invention exhibit exceptionally good strength to weight values, ranging from 115–163% that of commercial E-glass and in all cases but one exhibit better values, ranging from 102–114% that of S-glass.

The same can be said about the bending or flex to weight values of this invention. The glasses of this invention range from 121–145% that of E-glass and range from 108–120° that of S-glass.

The product of these two ratios $(TS/\rho \times Y/\rho)$ likewise shows that this invention produces fibers exhibiting exceptionally good values, ranging from 167–228% and from 109–131% that of E-glass and S-glass respectfully.

The glasses of this invention melt readily in existing commercial glass melting units. Commercial fiber forming processes comprises the steps of flowing a stream of molten glass composition from a melting source and attenuating said stream into fibers by mechanically pulling the stream with a pulling device. As the glass is attenuated, solidification takes place and fine diameter fibers are produced. Collet winders (Beach 2,391,870) and pulling wheels (Slayter et al. 2,729,027) are used as devices for mechanically attenuating fibers.

Certain glass compositions are difficult to fiberize because of their rapid devitrification rate at or near the liquidus temperature. Because of their viscosity-liquidus relationship, it has been found desirable to have a viscosity of from 100–300 poises, at the temperature at which the fibers are formed, in order to facilitate continuous formation of fibers. The glass compositions are brought to a temperature sufficiently above the liquidus to insure that devitrification will not occur during fiber forming. Heat removal from the glass during fiber forming is controlled by the use of cooling devices disposed about the orifices through which the molten glass emits as a stream, see Russell Re. 24,060. The removal of heat by cooling devices is in addition to the rapid cooling inherently present in fiber forming processes because of the rapid increase in the surface area to total volume relationship which takes place in the glass as it is fiberized.

What is claimed is:

1. A fiberizable glass composition consisting of silica, alumina and beryllia that yields high strength and high modulus to weight fibers wherein the mole percentages of each constituent of said glass composition are as follows:

| | Percent |
|---|---|
| $SiO_2$ | 60–80 |
| $Al_2O_3$ | 8–25 |
| $BeO$ | 8–30 |

2. A glass composition as described in claim 1 that is characterized by high strength and high modulus to weight ratios wherein the mole percentages of each constituent are as follows:

| | Percent |
|---|---|
| $SiO_2$ | 63–77 |
| $Al_2O_3$ | 10–20 |
| $BeO$ | 9–25 |

3. A glass composition as described in claim 1 that is characterized by high strength and high modulus to weight ratios wherein the mole percentages of each constituent are as follows:

| | Percent |
|---|---|
| $SiO_2$ | 70.0 |
| $Al_2O_3$ | 12.5 |
| $BeO$ | 17.5 |

4. A glass composition as described in claim 1 that is characterized by high strength and high modulus to weight ratios wherein the mole percentages of each constituent are as follows:

| | Percent |
|---|---|
| $SiO_2$ | 70.0 |
| $Al_2O_3$ | 17.0 |
| $BeO$ | 13.0 |

5. A glass composition as described in claim 1 that is characterized by high strength and high modulus to weight ratios wherein the mole percentages of each constituent are as follows:

| | Percent |
|---|---|
| $SiO_2$ | 68.6 |
| $Al_2O_3$ | 11.7 |
| $BeO$ | 19.7 |

6. A glass composition as described in claim 1 that is characterized by high strength and high modulus to weight ratios wherein the mole percentages of each constituent are as follows:

| | Percent |
|---|---|
| $SiO_2$ | 67.7 |
| $Al_2O_3$ | 14.4 |
| $BeO$ | 17.9 |

7. A glass composition as described in claim 1 that is characterized by high strength and high modulus to weight ratios wherein the mole percentages of each constituent are as follows:

| | Percent |
|---|---|
| $SiO_2$ | 70.0 |
| $Al_2O_3$ | 15.0 |
| $BeO$ | 15.0 |

8. A glass composition as described in claim 1 that is characterized by high strength and high modulus to weight ratios wherein the mole percentages of each constituent are as follows:

| | Percent |
|---|---|
| $SiO_2$ | 65.0 |
| $Al_2O_3$ | 14.6 |
| $BeO$ | 20.4 |

9. A glass composition as described in claim 1 that is characterized by high strength and high modulus to weight ratios wherein the mole percentages of each constituent are as follows:

| | Percent |
|---|---|
| $SiO_2$ | 76.6 |
| $Al_2O_3$ | 13.4 |
| $BeO$ | 10.0 |

10. Glass fibers formed from the glass composition of claim 1.

11. Glass fibers formed from a glass composition of claim 2.

12. Glass fibers formed from the glass composition of claim 3.

13. Glass fibers formed from the glass composition of claim 4.

14. Glass fibers formed from the glass composition of claim 5.

15. Glass fibers formed from the glass composition of claim 6.

16. Glass fibers formed from the glass composition of claim 7.

17. Glass fibers formed from the glass composition of claim 8.

18. Glass fibers formed from the glass composition of claim 9.

(References on following page)

References Cited

UNITED STATES PATENTS

| | | | |
|---|---|---|---|
| 2,978,341 | 4/1961 | Bastian et al. | 106—50 |
| 3,127,277 | 3/1964 | Tiede | 106—50 |
| 3,402,055 | 9/1968 | Harris et al. | 106—50 |

OTHER REFERENCES

Berry, L. G. and Mason, B., Mineralogy-Concepts, Descriptions, Determinations, San Francisco and London, W. H. Freeman and Co., 1959, pp. 538–39.

Mellor, J. W., A Comprehensive Treatise on Inorganic and Theoretical Chemistry, vol. VI; Longmans, Green & Co., 39 Paternoster Row, London E.C.4, 1925, pp. 802–805.

TOBIAS E. LEVOW, Primary Examiner

M. L. BELL, Assistant Examiner

U.S. Cl. X.R.

106—52